Sept. 10, 1929.  N. B. RIDDLE  1,728,137
DENTAL IMPRESSION TRAY
Filed June 2, 1927
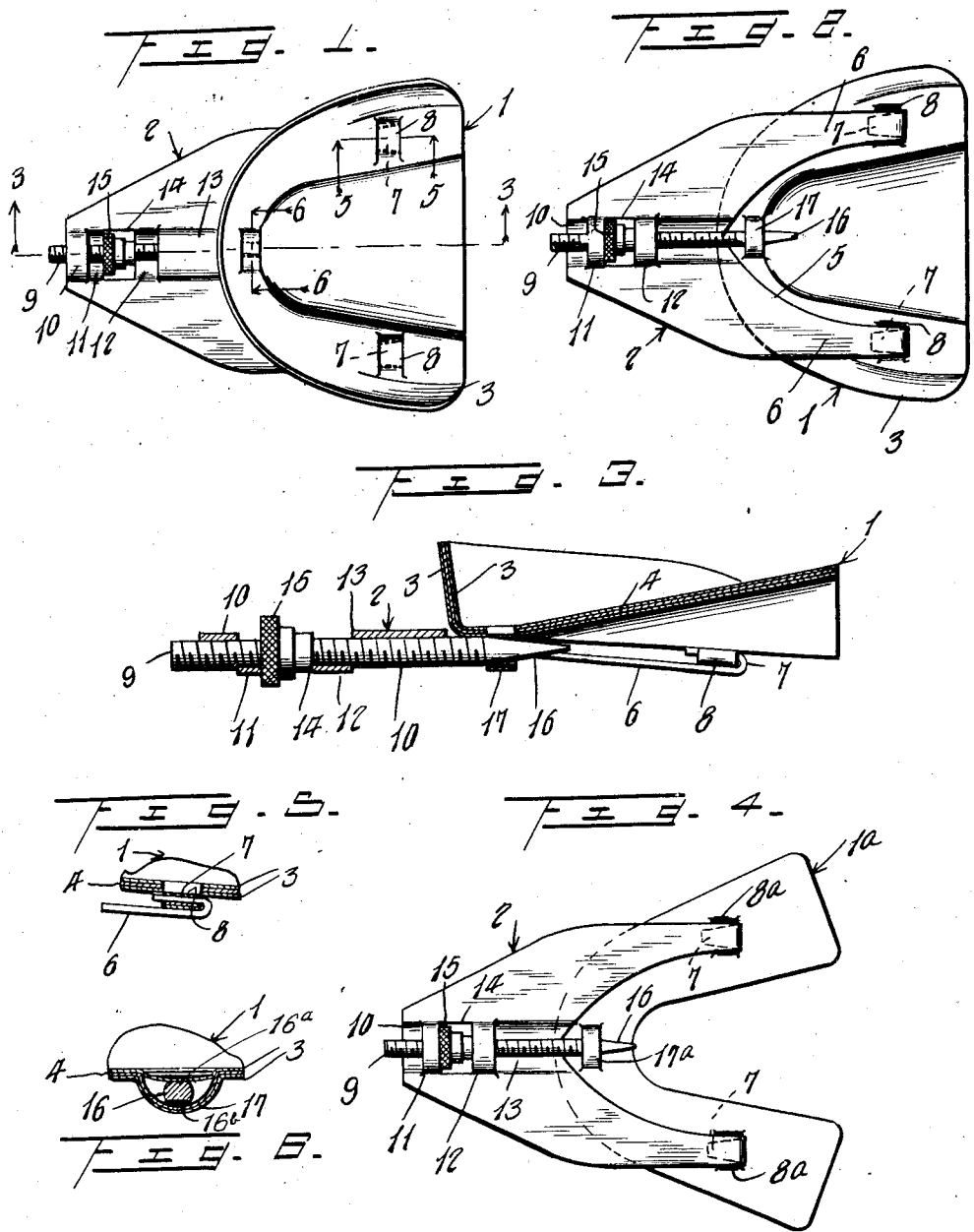
INVENTOR.
N. B. Riddle.
BY
ATTORNEY.

Patented Sept. 10, 1929.

1,728,137

UNITED STATES PATENT OFFICE.

NAPOLEON B. RIDDLE, OF ST. FRANCISVILLE, LOUISIANA.

DENTAL IMPRESSION TRAY.

Application filed June 2, 1927. Serial No. 196,041.

The invention relates to impression trays used by dentists to secure impressions of the upper and lower jaws of the mouth preparatory to making sets of false teeth, and has for its principal object the provision of means to sanitation in making impressions of the mouth by providing an impression tray that is extremely reasonable in cost of manufacture, so that it may be thrown away after once being used, and providing a removable handle that may be detached from one tray and attached to another.

A further object of the invention is the provision of a dental impression tray formed of fibrous material reinforced by a thin metal plate to insure holding the proper shape for making an impression, and provided with means to engage a detachable handle.

The invention will be described in detail hereinafter and will be found illustrated in the accompanying drawings in which Figure 1 is a top plan view of the impression tray and handle attached thereto for making an impression of the upper jaw, Figure 2 is a bottom plan view of the part shown in Figure 1, Figure 3 is a longitudinal sectional view on a plane indicated by the line 3—3 of Figure 1, Figure 4 is a top plan view of the tray and handle for making an impression of the lower jaw, and Figures 5 and 6, detail sectional views on planes indicated by the lines 5—5 and 6—6, respectively, of Figure 1.

In the drawings similar reference characters wil be used to designate corresponding parts throughout the several views.

In Figures 1, 2, and 3 is shown an impression tray and handle attached thereto for use in making an impression of the upper jaw, the tray being designated generally 1, and the handle 2. The tray 1 is formed of fibrous material such as paper sheets 3 secured on the upper and lower sides of a thin metal reinforcing plate 4, the parts being secured together either before being shaped into the form shown in these figures, or the metal plate 4 may be first formed and the paper sheets 3 then secured on the two sides thereof by cementing or other suitable manner. The handle 2 is preferably formed of inexpensive material, such as sheet metal, and has a bifurcated end 5, the arms 6 of which have returned ends forming hooks 7 that engage loops 8 formed by parallel incisions in the metal plate 4 and the lower layer or layers of fibrous material 3 to engage the hooks 7. 9 indicates a threaded rod that is slidably mounted on the handle 2, said handle having a guide for said rod comprising straps 10, 11, 12, and 13 formed by transverse incisions, the straps 10 and 13 being bent upwardly, and the straps 11 and 12 downwardly to form a guide for the threaded rod 9, and said straps 11 and 12 are spaced apart forming an opening 14 to receive a threaded nut 15 engaging the threaded rod 9 to actuate the rod. Said rod has a tapered end 16 to engage a loop 17 to clamp the handle 2 on the impression tray 1, said tapered end 16 having oppositely disposed flat sides $16^a$ and $16^b$, as shown in Figure 6 to engage the tray 1 and loop 17 to prevent rod 9 from turning.

In Figure 4 is shown an impression tray $1^a$ designed to be used in making an impression of the lower jaw, the handle 2 being shown secured thereto in the same manner as heretofore described in connection with the impression tray 1 for the upper jaw, the loops for engaging the hooks 7 being designated $8^a$, while the loop for engaging the end 16 of the rod 9 is designated $17^a$.

In use it will be apparent that as the impression trays 1 and $1^a$ are made of cheap material that after they have been once used they may be thrown away, the handle 2 being adapted to be transferred from one tray to another, and the practice of making impressions of the upper and lower jaws for making false teeth will be made more sanitary.

What is claimed is:—

1. A dental impression tray assembly, comprising a mold form, a detachable handle therefor, hooks on said handle to engage the mold form, a threaded rod movably carried by said handle, a nut engaging the rod to actuate it, and a loop on the mold form to engage said rod.

2. A dental impression tray assembly, comprising a mold form, a detachable handle therefor having a bifurcated end portion, hooks on the terminals of the arms of said bifurcated portion, the mold form having loops to engage said hooks, another loop on the mold form, a threaded rod carried by the handle, and a nut engaging the threaded rod to actuate it into and out of engagement with the loop.

3. A dental impression tray assembly, comprising a mold form, a detachable handle therefor having a hook on one end to engage the mold form, a loop on the mold form to engage the hook, a threaded rod movably carried by said handle, another loop on the mold form engageable with said rod, and a nut engaging said rod and handle to actuate the rod into and from engagement with the loop aforesaid.

4. A dental impression tray assembly comprising a mold form, a detachable handle therefor made of sheet metal and having a bifurcated end portion, hooks on the terminals of the arms of said bifurcated portion, loops on the mold form engageable by said hooks, another loop on the mold form, a threaded rod carried by said handle, a guide for said rod formed from straps made by transverse incisions of the material of the handle, a nut engaging said threaded rod to actuate it, and the handle provided with an opening to receive said nut.

In testimony whereof I affix my signature.

NAPOLEON B. RIDDLE.